(12) United States Patent
Mueller

(10) Patent No.: US 10,355,953 B2
(45) Date of Patent: Jul. 16, 2019

(54) METHOD FOR SIMULATING PROPAGATION TIMES IN NETWORKS

(71) Applicant: dSPACE digital signal processing and control engineering GmbH, Paderborn (DE)

(72) Inventor: Bjoern Mueller, Paderborn (DE)

(73) Assignee: dSPACE digital signal processing and control engineering GmbH, Paderborn (DE)

(*) Notice: Subject to any disclaimer, the term of this patent is extended or adjusted under 35 U.S.C. 154(b) by 179 days.

(21) Appl. No.: 15/412,524

(22) Filed: Jan. 23, 2017

(65) Prior Publication Data

US 2017/0134254 A1  May 11, 2017

Related U.S. Application Data

(63) Continuation of application No. PCT/EP2015/066045, filed on Jul. 14, 2015.

(30) Foreign Application Priority Data

Jul. 21, 2014 (EP) ..................... 14177808

(51) Int. Cl.
*H04L 12/26* (2006.01)
*H04L 12/40* (2006.01)
(Continued)

(52) U.S. Cl.
CPC .... *H04L 43/0852* (2013.01); *H04L 12/40091* (2013.01); *H04L 12/462* (2013.01); *H04L 12/4625* (2013.01); *H04L 41/12* (2013.01); *H04L 41/145* (2013.01); *H04L 43/0858* (2013.01); *H04L 45/02* (2013.01);
(Continued)

(58) Field of Classification Search
CPC ........... H04L 43/0852; H04L 12/40091; H04L 12/462; H04L 12/4625; H04L 41/12; H04L 41/145; H04L 43/0858; H04L 45/02; H04L 69/08; H04L 45/123; H04L 45/20; H04L 45/24; H04L 2012/40215; H04L 2012/40234; H04L 2012/40241
See application file for complete search history.

(56) References Cited

U.S. PATENT DOCUMENTS

| | | |
|---|---|---|
| 2003/0053466 A1 | 3/2003 | Bizet et al. |
| 2004/0218608 A1* | 11/2004 | Patiejunas ............... H04L 43/50 370/395.21 |

(Continued)

*Primary Examiner* — Ajay Cattungal
(74) *Attorney, Agent, or Firm* — Muncy, Geissler, Olds & Lowe, P.C.

(57) ABSTRACT

A method in which the propagation times of a target network are simulated in an actual network, wherein the topology of the target network includes a number of senders and a number of receivers, and wherein the topology of the actual network includes one or more of the senders and receivers. A path between a first sender and a first receiver in the topology of the actual network differs from the path between the first sender and the first receiver in the topology of the target network, wherein in the actual network at least one first message of the first sender is received through a first network interface by a gateway having at least two network interfaces, is delayed by a delay, and is sent through a second network interface on a path to the first receiver.

15 Claims, 9 Drawing Sheets

(51) Int. Cl.
*H04L 12/46* (2006.01)
*H04L 12/24* (2006.01)
*H04L 12/751* (2013.01)
*H04L 29/06* (2006.01)
H04L 12/721 (2013.01)
H04L 12/707 (2013.01)
H04L 12/733 (2013.01)

(52) U.S. Cl.
CPC ............ *H04L 69/08* (2013.01); *H04L 45/123* (2013.01); *H04L 45/20* (2013.01); *H04L 45/24* (2013.01); *H04L 2012/40215* (2013.01); *H04L 2012/40234* (2013.01); *H04L 2012/40241* (2013.01)

(56) References Cited

U.S. PATENT DOCUMENTS

| | | | | | |
|---|---|---|---|---|---|
| 2007/0277237 | A1* | 11/2007 | Adelman | .............. | H04L 41/145 726/22 |
| 2008/0317039 | A1* | 12/2008 | Satterlee | ................ | H04L 12/66 370/395.5 |
| 2009/0190585 | A1* | 7/2009 | Allen | .................. | H04L 51/066 370/390 |
| 2010/0002591 | A1* | 1/2010 | Mizutani | ............. | H04L 43/0852 370/241.1 |
| 2013/0282352 | A1* | 10/2013 | Gray | .................. | G06F 17/5036 703/15 |
| 2013/0286860 | A1* | 10/2013 | Dorenbosch | .......... | H04W 24/06 370/252 |
| 2013/0311966 | A1* | 11/2013 | Furuta | ................ | G06F 17/5009 716/136 |
| 2015/0331771 | A1* | 11/2015 | Conway | ............... | H04W 24/08 714/704 |

\* cited by examiner

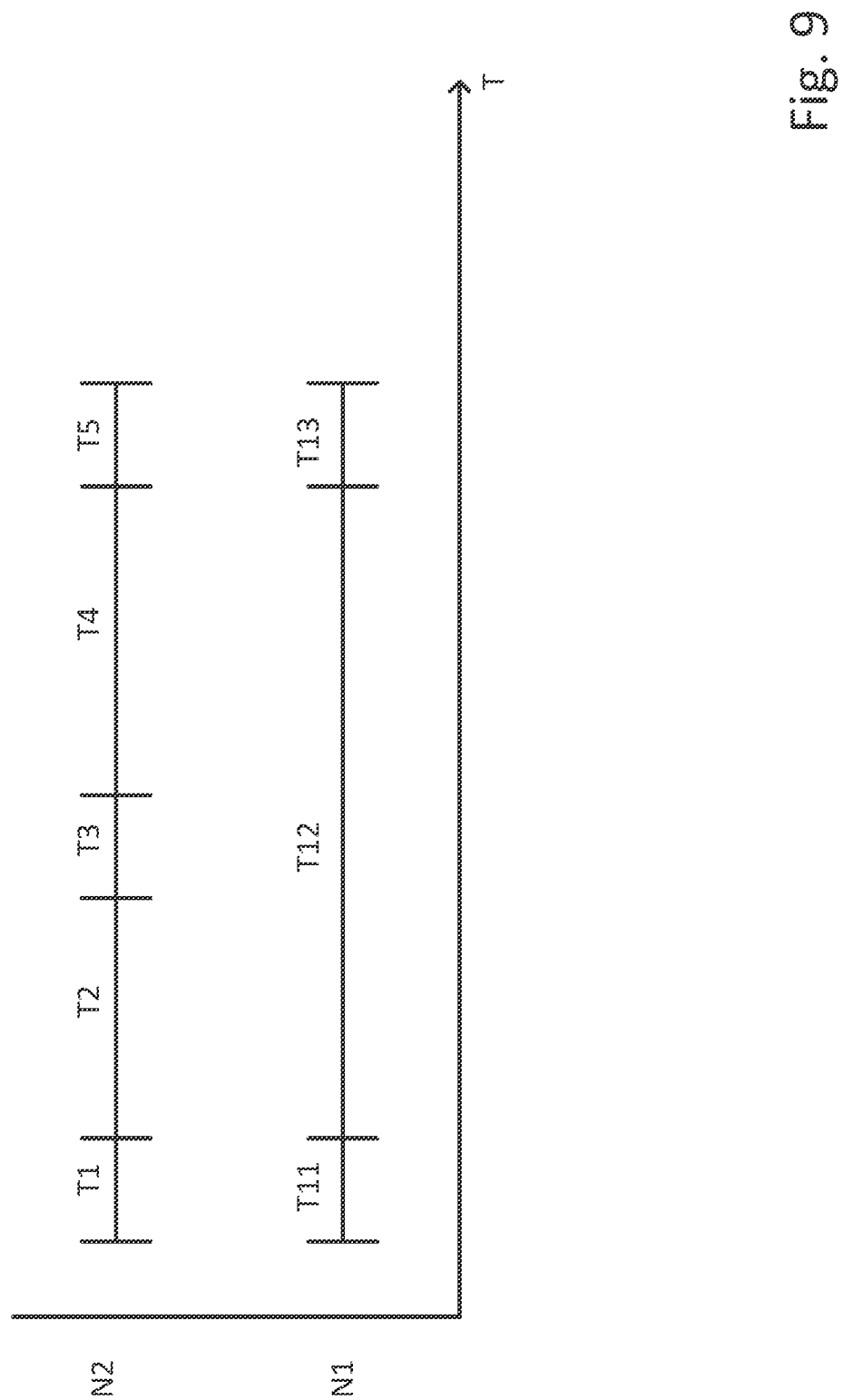

METHOD FOR SIMULATING PROPAGATION TIMES IN NETWORKS

This nonprovisional application is a continuation of International Application No. PCT/EP2015/066045, which was filed on Jul. 14, 2015, and which claims priority to European Patent Application No. 14177808.4, which was filed in Europe on Jul. 21, 2014, and which are both herein incorporated by reference.

BACKGROUND OF THE INVENTION

Field of the Invention

The present invention is directed to a method and device in which the propagation times of a target network are simulated in an actual network.

Description of the Background Art

Communication between senders and receivers in a network need to be tested. This is difficult when the network cannot be constructed as it is intended to be used later. In other words, the target network is not suitable for the test. This may be the case, for example, when not all elements of the target network are available or when the messages exchanged between senders and receivers are to be monitored. Monitoring of this type generally requires a change in the network, which in turn changes the characteristics of the network, for example the propagation times of the messages. Another option for monitoring is, for example, to connect all senders and receivers to a central gateway. The gateway then transmits the messages between sender and receiver and can monitor all messages. This star topology structure generally is not the structure of the target network, and changes the propagation times of the messages, for example.

SUMMARY OF THE INVENTION

It is therefore an object of the invention to advance the state of the art.

In an exemplary embodiment, a method is provided in which the propagation times of a target network are simulated in an actual network, wherein the topology of the target network includes a number of senders and a number of receivers, and wherein the topology of the actual network includes one or more of the senders and receivers, wherein the path between a first sender and a first receiver in the topology of the actual network differs from the path between the first sender and the first receiver in the topology of the target network, wherein in the actual network at least one first message of the first sender is received through a first network interface by a gateway having at least two network interfaces, is delayed by a delay, and is sent through a second network interface on a path to the first receiver, wherein the path of the first message is determined in accordance with the topology of the actual network, and the delay of the message is determined in accordance with the topology of the target network such that the propagation time of the first message in the actual network is substantially equal to the propagation time of the first message in the target network.

According to an embodiment of the invention, the propagation times of messages as they are to be expected in a target network are to be simulated in an actual network. In this context, the target network includes at least a number of senders and a number of receivers that are networked together. In addition, other network elements such as forwarding elements, for instance routers or switches, may also be included. The structure of the connections of the senders, receivers, and other network elements is arbitrary. The target network can represent an intermeshed network or a tree topology, for example. Senders and receivers of messages are also referred to hereinafter in general as network subscribers. In order to simulate the propagation times of the target network, one or more senders and one or more receivers that are equivalent to the senders and receivers of the target network are connected in an actual network. In this design, the propagation time for the first message from the first sender to the first receiver in the actual network without delay by the gateway is shorter than in the target network. The propagation time in the target network is determined by the topology of the target network, which is to say by the network elements and the lines that connect the network elements. Both the lines and the network elements contribute to the propagation time of the messages in the target network. The first delay of the first message in the actual network can then be chosen such that the propagation time of the first message in the actual network is substantially equal to the propagation time of the first message in the target network. The period from the sending of the first message by the first sender to the reception of the first message by the first receiver is thus independent of whether the first sender and the first receiver are installed in the actual network or in the target network. The communication between the first sender and the first receiver can therefore be tested even though the topology of the network between the first sender and the first receiver is different. As a result of the simulation of different topologies of target networks, the advantages and disadvantages of the topologies and different configurations of network subscribers and segment coupling elements can be evaluated faster. For example, bottlenecks in communication or highly loaded network lines can be detected. The propagation times exhibited by different messages through the target network are simulated by the gateway. By means of the simulation of the propagation times of different target networks, these networks can be efficaciously compared or simulated or reproduced.

It should be noted that a substantial equivalence of the propagation times in the actual network and in the target network can be understood to mean that the propagation times differ by less than 10%. Preferably, the propagation times differ by less than 1%.

It is advantageous when the topology of the target network is known to the gateway. The gateway can then determine the path through the target network for the first message based on the topology of the target network, determine a propagation time for this path, and delay the first message such that the propagation time of the first message in the actual network is substantially equal to the propagation time of the first message in the target network.

In an embodiment of the invention, the path between the first sender and a second receiver in the topology of the target network differs from the path between the first sender and the first receiver in the topology of the target network, wherein in the actual network at least one second message of the first sender is received by the gateway, is delayed by a second delay, and is sent on a path to the second receiver, wherein the path of the second message is determined in accordance with the topology of the actual network, and the delay of the second message is determined in accordance with the topology of the target network such that the propagation time of the second message in the actual network is substantially equal to the propagation time of the second message in the target network.

In an embodiment, the gateway is capable of delaying different messages differently. In this way, a delay for the messages in the actual network can be determined that corresponds to the path length in the target network. In the special case that a delay of less than zero results from the topology of the target network, the message is not delayed.

In an embodiment of the invention, the processing times of the network elements in the target network are known to the gateway.

With known processing times of the network elements in the target network, the propagation time of the first message through the target network can be determined by adding the processing times of the network elements on the path of the first message through the target network. Switches, hubs, and routers are considered network elements here, for example. The processing time is the time between receiving and sending a message. The processing time of a network element is frequently known from the manufacturer or can be determined in ways known to the person skilled in the art, for example by measurement on an identical or similar device.

In an embodiment of the invention, the propagation times between the network elements in the target network are known to the gateway.

With known propagation times between the network elements in the target network, the propagation time of the first message through the target network can be determined by adding the propagation times between the network elements in the target network on the path of the first message through the target network. The determination of the propagation times in the target network can be further enhanced by the combination of known processing times of the network elements and known propagation times between the network elements in the target network.

In an embodiment, the target network is at least partially an Ethernet, CAN, and/or FlexRay network.

In an embodiment, a copy of the first message is sent by the gateway to a third receiver.

The creation and collection of copies makes it possible to reconstruct the exchange of messages at a later time. The capability for reconstruction becomes more precise when copies of many messages are collected.

In an embodiment, the first message is tested by the gateway for at least one feature, and as a function of the test a copy of the first message is sent to a third receiver.

By testing the first message, the gateway can determine whether it is necessary to send a copy. In this way, only messages whose features match the filter specified for the test are copied. The feature to be tested can be, for example, the IP address of the sender or receiver, the size of the message, the time of the message, a message ID, or a keyword in the message. The effectiveness of the method is increased by the reduction in the messages to be copied.

In an embodiment of the invention, the first message is altered by the gateway after being received and before being sent to the second receiver.

In an embodiment of the invention, the alteration of the first message concerns a conversion of the first message from a first protocol to a second protocol.

A conversion of the protocol in which the first message is sent is advantageous, for example, when the first sender and the first receiver communicate via different protocols. For example, the sender may send the first message via Ethernet as a UDP/IP message, and the receiver may expect a FlexRay message. Then the gateway can alter the first message accordingly. A bus protocol can be a protocol according to a CAN standard, a LIN standard, or a FlexRay standard, for example. A network protocol can be a protocol according to an Ethernet format or a MOST format, for example.

In an embodiment of the invention, the alteration of the first message concerns an alteration of the content of the message.

Through such an alteration of the first message it is possible, for example, to simulate a malfunction of a network element in the target network. Thus, for example, it is possible to alter or leave out individual bits of the message or add additional bits.

In an embodiment of the invention, the gateway determines the loading of network elements and/or network lines in the target network and additionally increases the delay of the first message in the event of high loading of network elements and/or network lines.

Thus, in addition to determining the propagation time that results from the path through the target network, the gateway determines a delay time that results from the loading of the network elements and/or network lines in the target network. A delay time of this nature due to loading may arise, for example, because a network element can only execute one task at a time, and as a result other tasks, such as processing of the first message, must wait until the completion of the first task. Other delay times may arise when a third message is transmitted in the target network on a network line located on the path of the first line, and the transmission of the first message must wait until the completion of the transmission of the third message. Consequently, the delay of the first message must be increased by the gateway in order to compensate for the increased propagation time in the target network due to the loading of the network elements and/or network lines so that the propagation time of the first message in the actual network is substantially equal to the propagation time of the first message in the target network.

In an embodiment, a third message is received by the gateway through a third network interface, the path of the third message in the target network is determined by the gateway, and the delay of the first message is increased if the third message in the target network results in an additional delay of the first message.

Accordingly, the gateway determines for two different messages whether the paths of the messages in the target network intersect and whether the loading of the network elements and/or network lines in the target network caused by the third message results in an additional delay of the first message. A determination of this type is also possible in the other direction, which is to say that it is determined whether the loading of the network elements and/or network lines in the target network caused by the first message results in an additional delay of the third message. Especially for large networks, it is advantageous to precisely determine the loading of the network elements and/or network lines in the target network over time, which is to say to determine when the third message results in loading of which network elements and/or network lines in the target network. Accordingly, the path of the first message through the target network can be broken down in time, and intersections of the paths can be detected.

In this process, which message is delayed may depend on, e.g., the priority of the messages. Thus, a network element in the target network that receives two messages at essentially the same time will first process the message with the higher priority and will only process the message with the lower priority thereafter. The gateway in the actual network will simulate such behavior and will correspondingly delay the message with the lower priority more than the message with the higher priority.

In an embodiment of the invention, a fourth message within the target network is simulated by the gateway, and the delay of the first message is increased if the fourth message in the target network results in an additional delay of the first message.

The network traffic within the target network can be recreated through the simulation of additional messages by the gateway. In particular, the simulated messages can be simulated through the loading they cause of the network elements and/or network lines in the target network. The loading of the network elements and/or network lines in the target network may then result in additional delays of the first message.

The gateway can thus simulate both receiver and sender. Network subscribers can therefore successfully send messages even if the receivers provided in the target network do not exist in the actual network as real network subscribers. Messages to nonexistent receivers are then received by the gateway and not forwarded. Similarly, network subscribers may receive messages that are provided even when the senders provided in the target network do not exist in the actual network as real network subscribers. In this case the gateway is configured such that it creates the messages of the simulated senders and sends them to the receivers. If senders and receivers provided in the target network do not exist in the actual network as real network subscribers, the gateway can nonetheless simulate the network traffic between the network subscribers and account for the loading of the network in determining the delays of the real messages sent in the actual network.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein:

FIG. 9 shows a comparison of propagation times in different networks.

DETAILED DESCRIPTION

Figure 1:
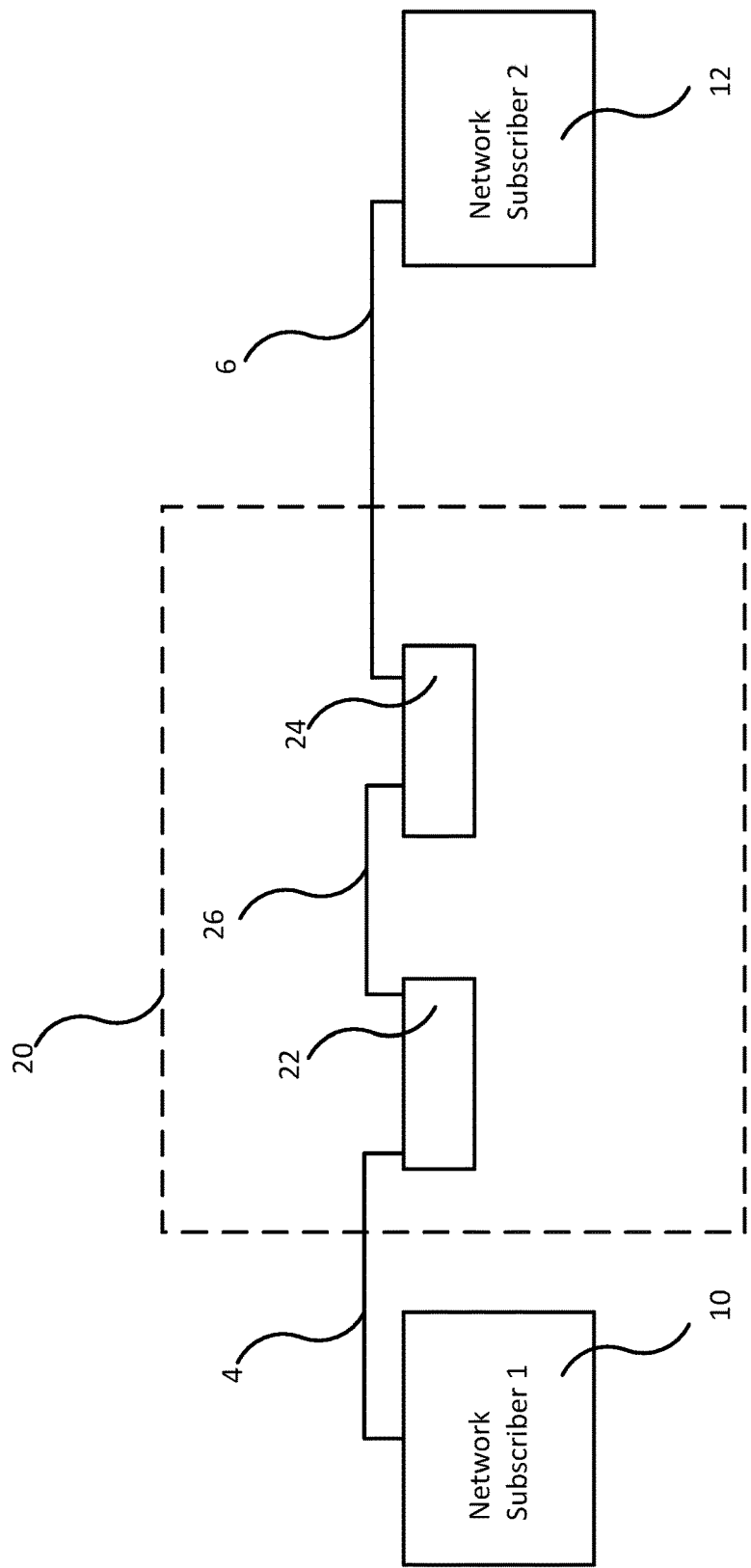
FIG. 1 shows a schematic view of a target network.

FIG. 1 shows a schematic view of a target network. In the target network, a first network subscriber 10 is connected through the first network line 4 to a first network element 22, and a second network subscriber 12 is connected through the second network line 6 to a second network element. A third network line 26 connects the first network element 22 and the second network element 24 to one another. A first message, which is sent by the first network subscriber 10 to the second network subscriber 12, is routed in the target network from the first network subscriber 10 through the first network line 4 to the first network element 22, from there through the third network line 26 to the second network element 24, and onward through the second network line 6 to the second network subscriber 12.

Figure 2:
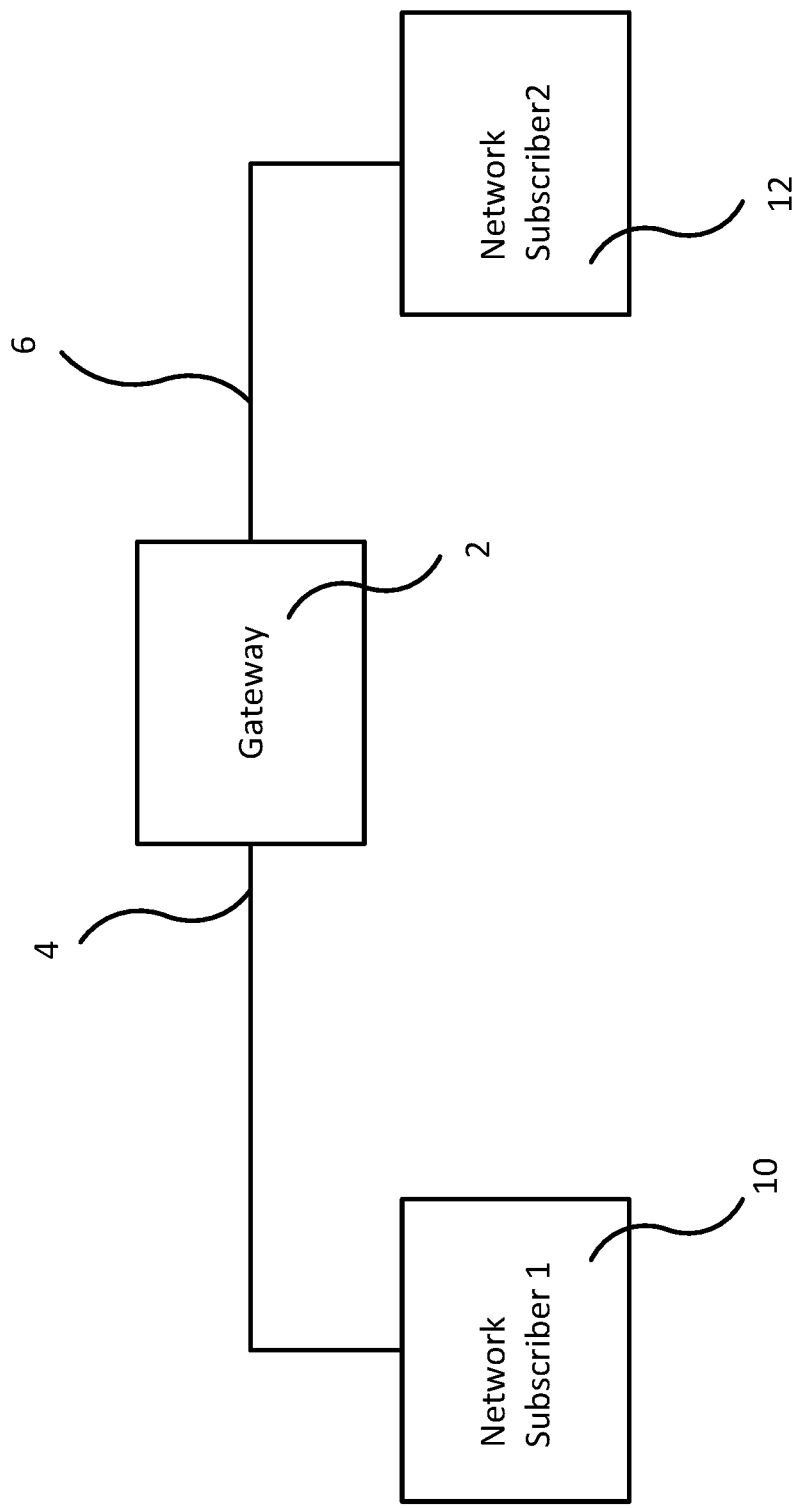
FIG. 2 shows a schematic view of an actual network with a gateway according to the invention.

The illustration in FIG. 2 shows a schematic view of an actual network with a gateway according to the invention. The first network subscriber 10 is connected to the gateway 2 according to the invention through the first network line 4, and the second network subscriber 12 is connected to it through the second network line 6. For each network line, the gateway 2 provides a network interface to which the relevant network line is connected. For simulation of the target network by the actual network, the topology of the target network is configured into the gateway 2. The gateway 2 then replaces, in the actual network, a network portion 20 of the target network. In the example of the target network from FIG. 1, the network portion replaced by the gateway comprises the first network element 22, the second network element 24, and the third network line 26. The paths and delays in the target network are known to the gateway 2, and the gateway 2 can delay messages in the actual network such that the propagation times of the messages in the actual network are substantially equal to the propagation times of the messages in the target network. The first network subscriber and the second network subscriber are similar in the actual network and in the target network, advantageously they are of identical construction or are identical. The network subscribers in the target network and in the actual network are hereinafter considered equivalent.

A first message that is sent by the first network subscriber 10 to the second network subscriber is initially transmitted in the actual network by the first network subscriber 10 through the first network line 4 to the gateway 2, and is then transmitted by the gateway 2 through the second network line 6 to the second network subscriber 12. In this process, the gateway 2 temporarily stores the first message and delays the transmission to the second network subscriber 12 such that the propagation time of the first message in the actual network is substantially equal to the propagation time of the first message in the target network. The period from the sending of the first message by the first network subscriber 10 to reception of the first message by the second network subscriber 12 is thus independent of whether the first network subscriber 10 and the second network subscriber 12 are installed in the actual network or in the target network. The gateway 2 thus simulates the propagation time through a target network. An example of a target network whose propagation times are simulated by a gateway 2 according to the invention is shown in FIG. 1. The target network can in general be designed in any desired manner and can contain a multiplicity of network elements, network lines, and network subscribers.

Figure 3:
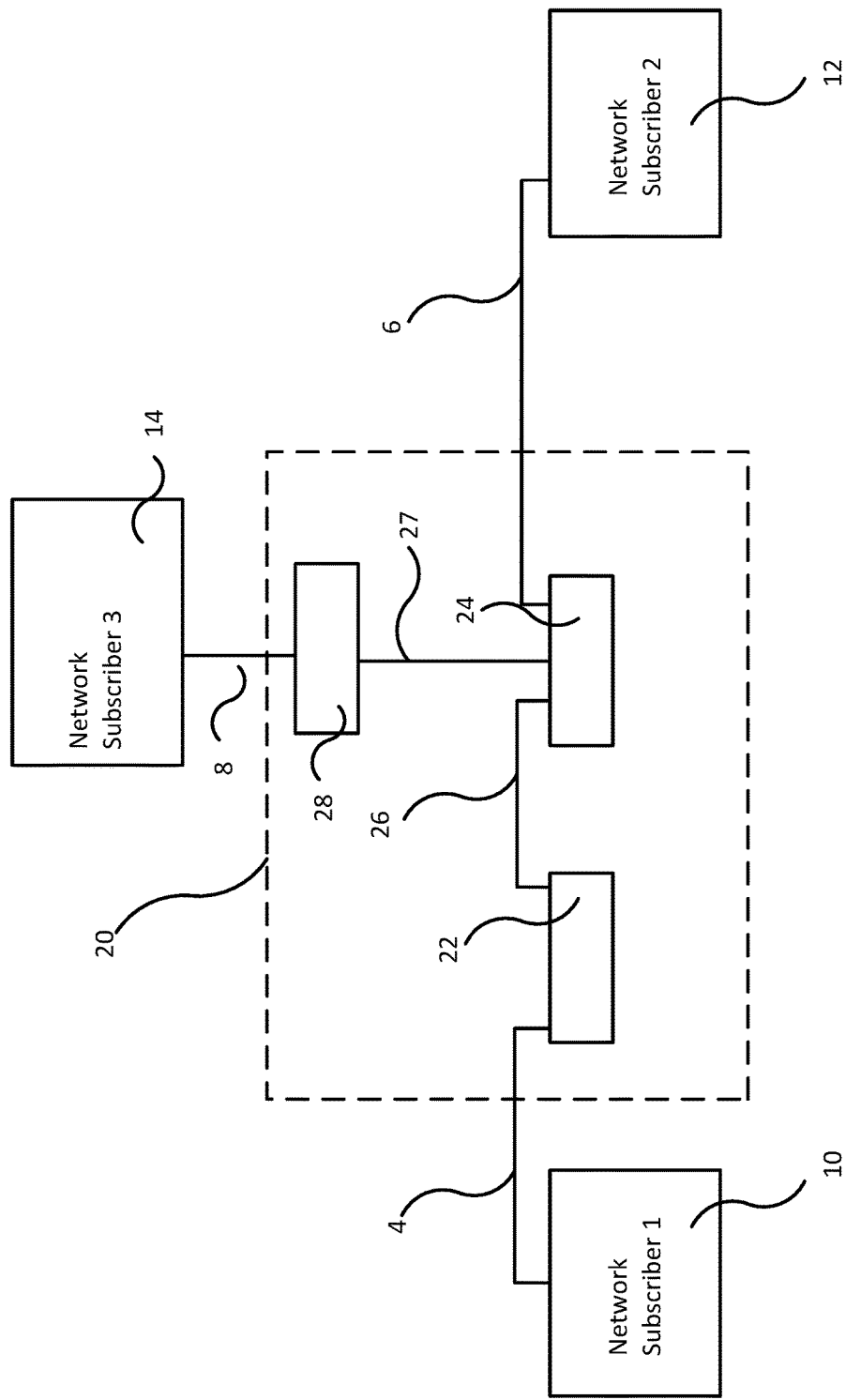
FIG. 3 shows a schematic view of another actual network.

FIG. 3 shows a schematic view of another target network. Only the differences from the illustration in FIG. 1 are explained below. A third network element 28 is connected through a fifth network line 27 to the second network element 24. The third network subscriber 14 is connected through the fourth network line 8 to the third network element 28. A second message that is sent from the first network subscriber 10 to the third network subscriber 14 would, in the topology of the target network, therefore have to take the path through the first network line 4, the three network elements and the network lines connecting them, and also the third network line 8 to the third network subscriber 14. Consequently, the path and the propagation time of the second message from the first network subscriber 10 to the third network subscriber differ from the path and the propagation time of the first message from the first network subscriber 10 to the second network subscriber 12.

Figure 4:
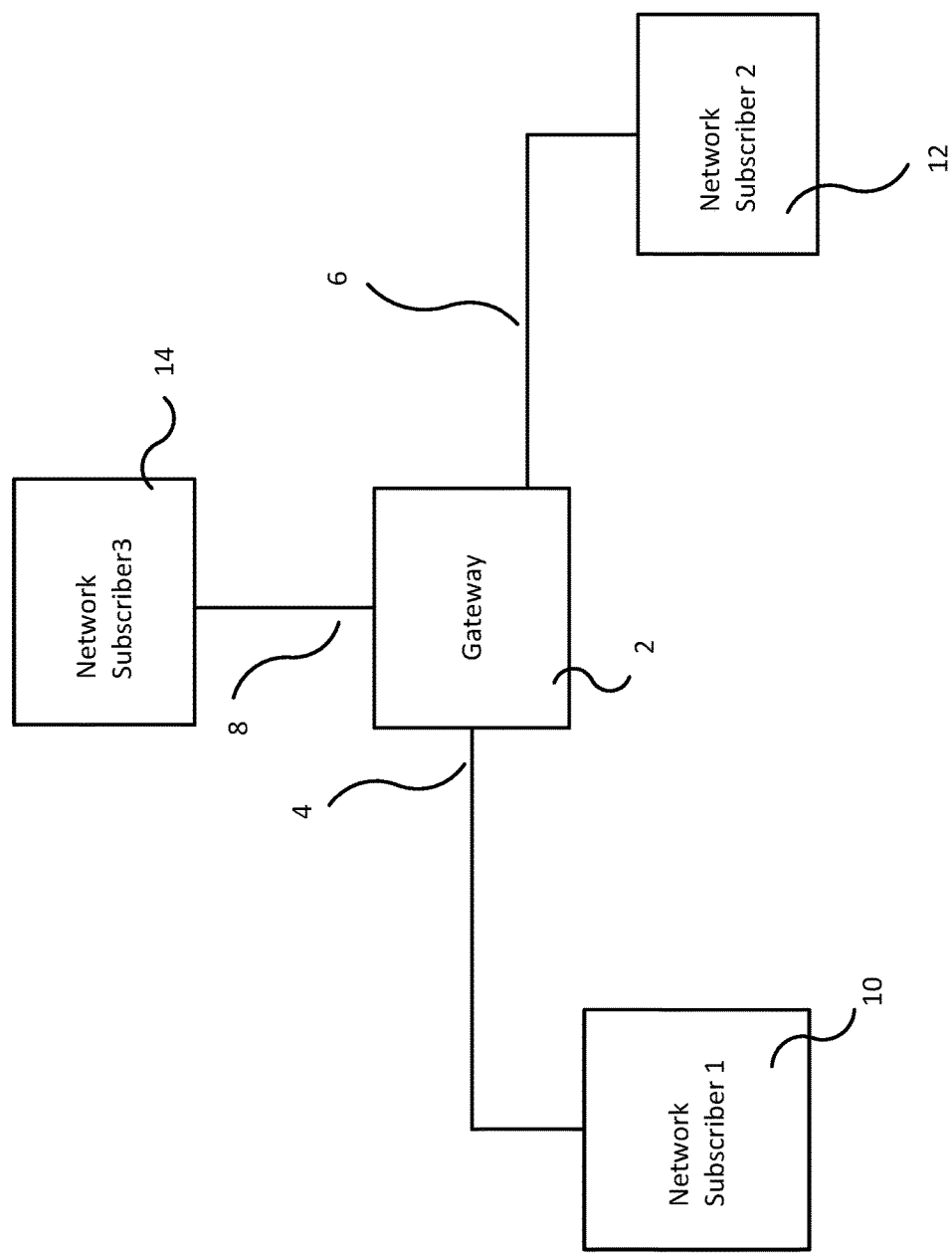
FIG. 4 shows a schematic view of another target network.

FIG. 4 shows a schematic view of another actual network. Only the differences from the illustration in FIG. 2 are explained below. The third network subscriber 14 is connected through the fourth network line 8 to the gateway 2. The second message that is sent from the first network subscriber 10 to the third network subscriber 14 in the actual network is received by the gateway 2 through the first network line 4, delayed if applicable, and sent through the fourth network line 8 to the third network subscriber 14. The network portion 20 of the target network from FIG. 3 that is replaced by the gateway in the actual network from FIG. 4 is expanded in comparison to the example from FIGS. 1 and 2 by the third network element 28 and the fifth network line between the second network element and the third network element. The gateway can determine an appropriate delay for a message sent in the actual network from the known topology of the target network and, if applicable, additional information such as the processing times of the network elements or the propagation times between the network elements. In this process, the path of the second message, which is to say which network line the second message is to be sent through, is determined by the gateway 2 in accordance with the topology of the actual network, and the delay of the second message is determined in accordance with the topology of the target network such that the propagation time of the second message in the actual network is substantially equal to the propagation time of the second message in the target network. An example target network according to whose topology the delay could be determined is shown in FIG. 3.

A third message that is sent from the second network subscriber 12 to the third network subscriber 14 would, in the topology of the target network from FIG. 3, therefore take the path from the second network subscriber 12 through the second network line 6, the second network element 24, the fifth network line 27, the third network element 28, and the fourth network line 8 to the third network subscriber 14. This results in an additional loading of these elements and can thus result in an additional delay of the first message. For example, the second network element 24 may be busy with the processing of the third message when it receives the first message and therefore cannot process the first message until it has completed the processing of the third message. The gateway in the actual network as is shown in FIG. 4, which replaces the above-described network portion 20 of the target network from FIG. 3, will detect such a loading of the second network element 24 when it receives the third message before it has sent the first message to the second network subscriber, and will delay the first message such that the propagation time in the actual network is substantially equal to the increased propagation time in the target network.

Figure 5:
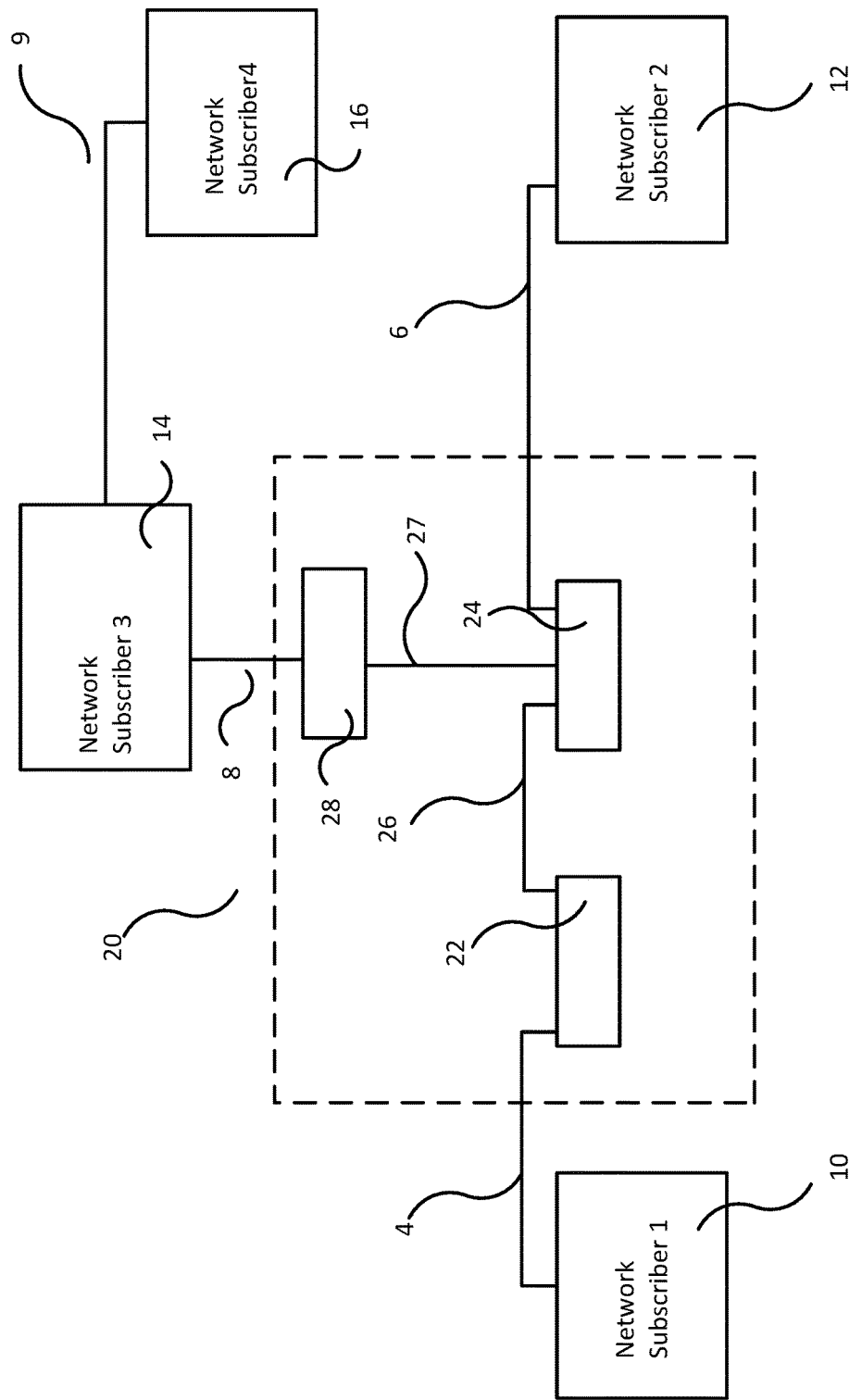
FIG. 5 shows a schematic view of another actual network.

FIG. 5 shows a schematic view of another target network. Only the differences from the illustration in FIG. 3 are explained below. A fourth network subscriber 16 is connected through a sixth network line 9 to the third network subscriber 14. A fourth message that is sent from the first network subscriber 10 to the fourth network subscriber 16 would, in the topology of the target network, therefore take the path through the first network line 4, the three network elements and the network lines connecting them, and also the fourth network line 8 to the third network subscriber 14, and from there through the sixth network line 9 to the fourth network subscriber 16. In this case, the network portion 20 of the target network from FIG. 5 that is replaced by the gateway 2 in the actual network from FIG. 6 is identical to the replaced network portion 20 from the example in FIGS. 3 and 4.

Figure 6:
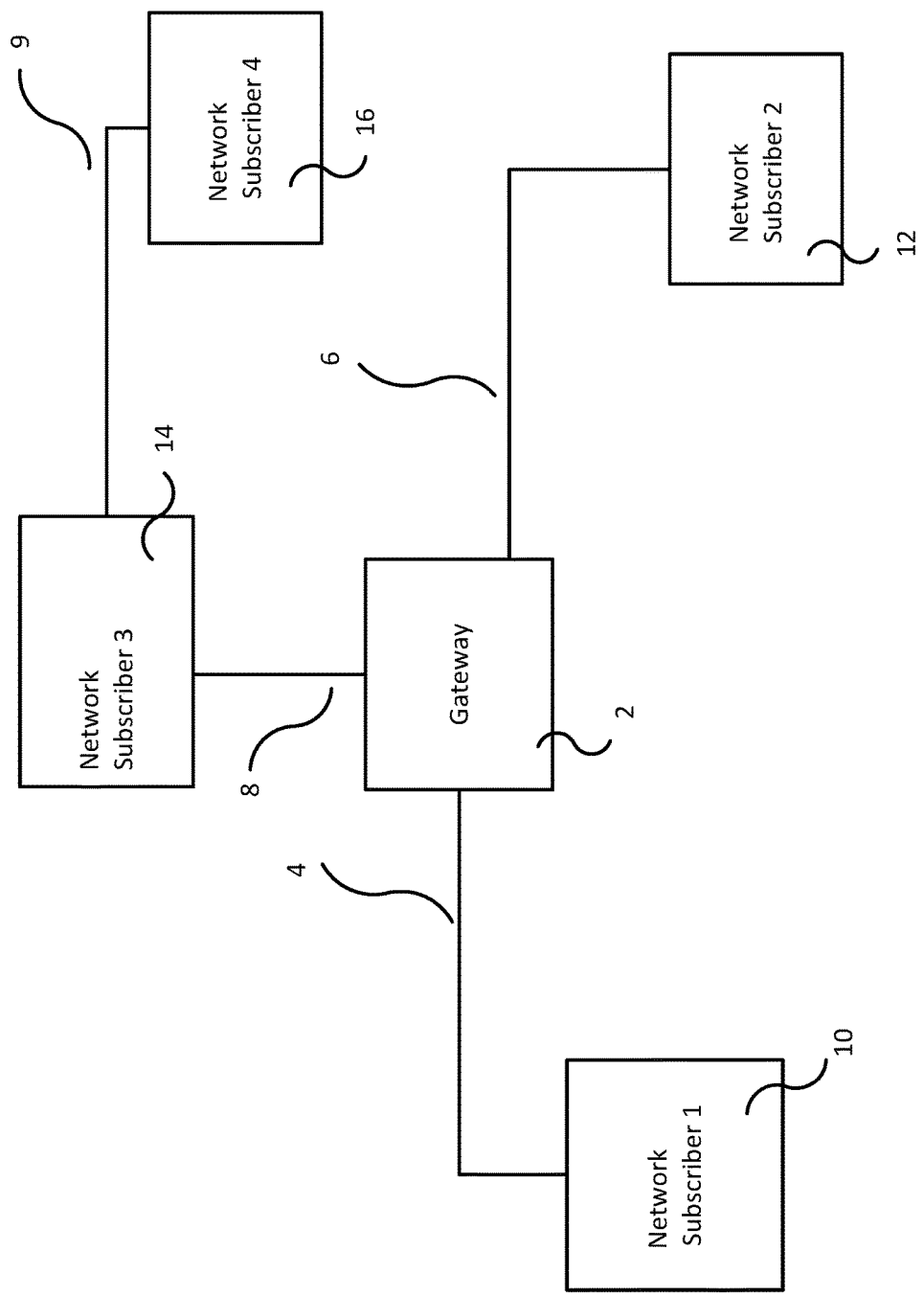
FIG. 6 shows a schematic view of another target network.

A schematic view of another actual network is shown in FIG. 6. Only the differences from the illustration in FIG. 4 are explained below. The fourth network subscriber 16 is connected through the sixth network line 9 to the third network subscriber 14. The fourth message that is sent from the first network subscriber 10 to the fourth network subscriber 16 is received through the first network line 4 by the gateway 2, delayed if applicable, and sent through the fourth network line 8 on a path to the fourth network subscriber. The gateway 2 will determine the path for the fourth message in accordance with the topology of the actual network and the delay in accordance with the target network, so that the propagation time of the second message in the actual network is substantially equal to the propagation time of the second message in the target network.

Figure 7:
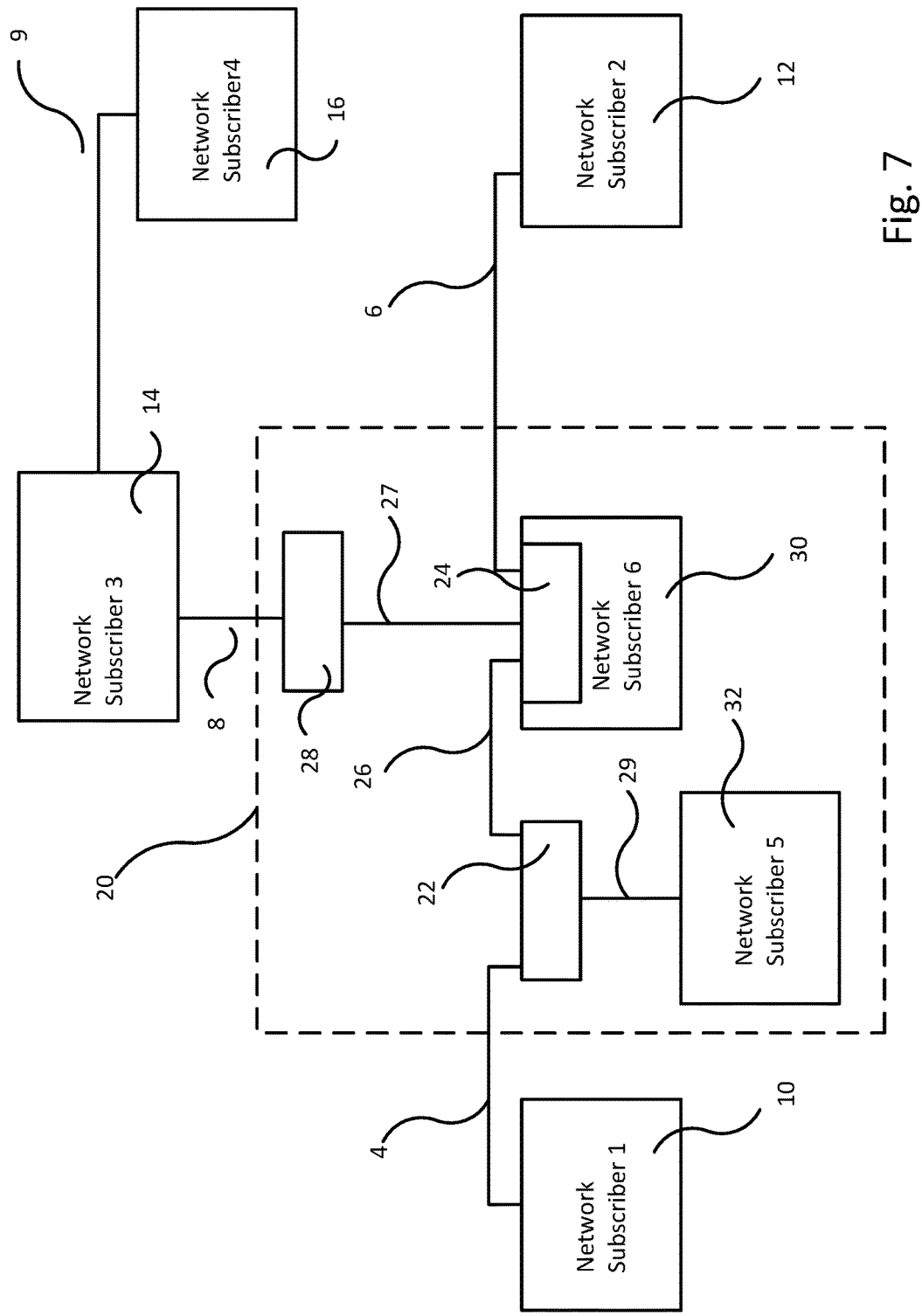
FIG. 7 shows a schematic view of an actual network with a gateway according to the invention and a monitoring unit.

FIG. 7 shows a schematic view of another target network in which the network portion 20 that is replaced by the gateway 2 from FIG. 6 differs from the network portion from FIG. 5. Only the differences from the illustration in FIG. 5 are explained below. A fifth network subscriber 32 is connected through a seventh network line 29 to the first network element 22. The second network element 24 is implemented as part of a sixth network subscriber 30. The network portion 20 of the target network from FIG. 7 that is replaced by the gateway in the actual network from FIG. 6 is expanded by the fifth network subscriber 32, the sixth network subscriber 30, and the seventh network line 29. A fifth message that is sent from the fifth network subscriber 32 to the third network subscriber 14 would, in the topology of the target network, therefore take the path through the seventh network line 29, the first network element 22, the third network line 26, the second network element 24, the fifth network line 27, the third network element 28, and the fourth network line 8 to the third network subscriber 14. If the first message is also to be transmitted from the first network subscriber 10 to the second network subscriber at the same time, additional delays can occur since both messages must be transmitted through the first network element 22, the third network line 26, and the second network element 24. In the actual network from FIG. 6, the gateway 2 simulates the replaced network portion 20 of the target network, and thus also the fifth network subscriber 32. The gateway will accordingly determine the loading of the network elements and of the network lines by the fifth message and the delay of the first message and the fifth message caused thereby, and will choose the delay of the first and the fifth message such that the propagation times of the messages in the actual network are substantially equal to the propagation times of the messages in the target network.

A sixth message that is sent from the sixth network subscriber 30 to the fifth network subscriber 32 is merely simulated in the actual network and is neither received by the gateway 2 nor sent by the gateway 2. Nevertheless, the loading of the network elements and network lines in the replaced network portion 20 by the sixth message is determined by the gateway 2 and the additional delays of other messages caused thereby are taken into account.

Figure 8:
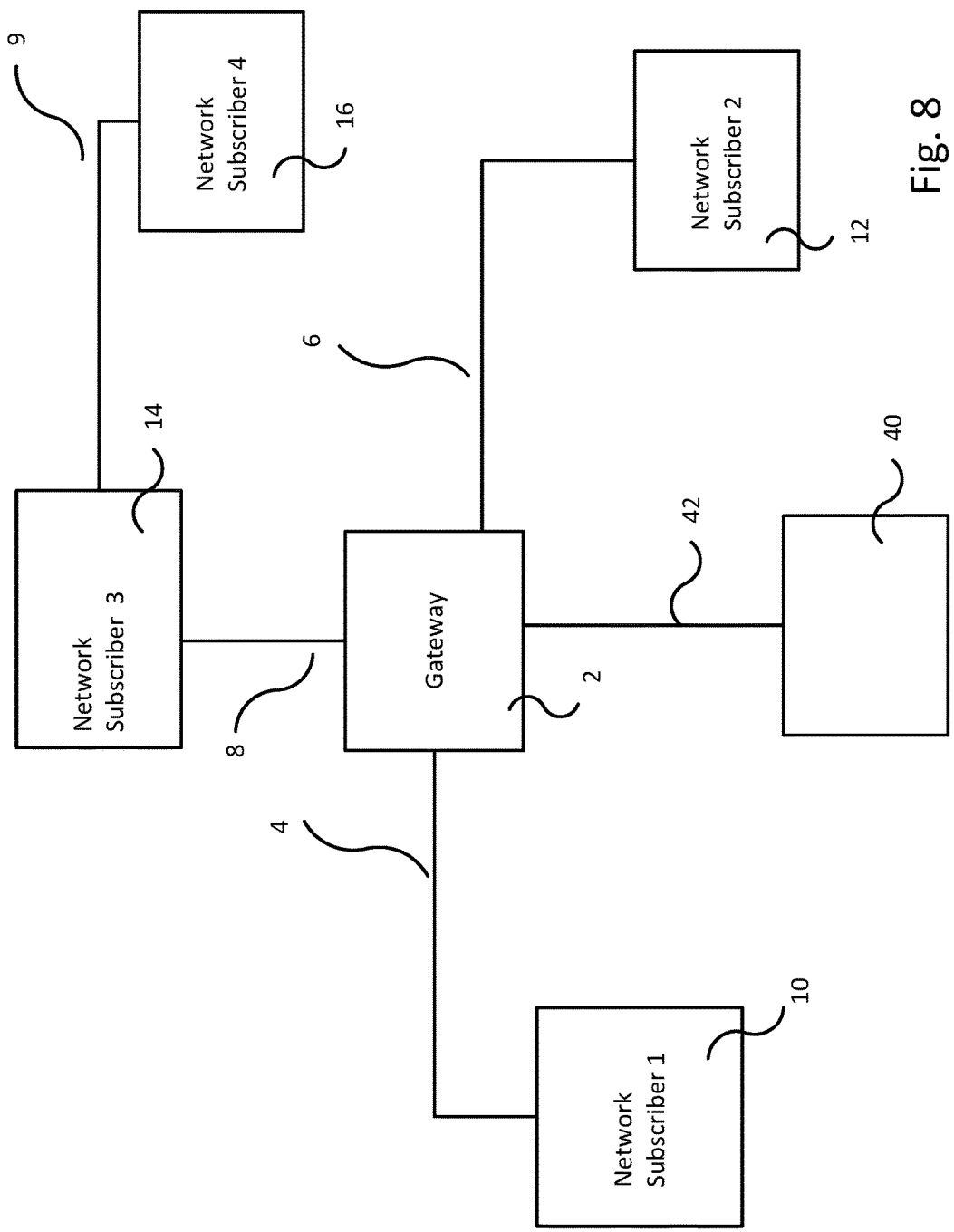
FIG. 8 shows a schematic view of an actual network.

A schematic view of another actual network is shown in FIG. 8. Only the differences from the illustration in FIG. 6 are explained below. A monitoring unit 40 is connected through a seventh network line 42 to the gateway 2. The gateway 2 can send copies of messages that are received and/or sent by the gateway to the monitoring unit 40. This can take place for all messages or for selected messages after filtering. A filtering of this type can be based on, e.g., properties of the messages such as the sender, receiver, size, identification number, or the like. The storage of the copies of the messages makes it possible to reconstruct the network traffic and detect problems in the communication. In a variant of the invention the monitoring unit 40 can also form a unit with the gateway 2.

FIG. 9 shows a comparison of different propagation times of messages. The time T is plotted on the horizontal axis. A first propagation time N1 shows the propagation time of the first message by way of example for the embodiment of the actual network from FIG. 1. Here, the first message is sent from the first network subscriber 10 to the second network subscriber 12 by the gateway 2, wherein the gateway 2 delays the first message according to the invention. The first message is transmitted from the first network subscriber 10 to the gateway 2 in a first time period T11, is processed and delayed by the gateway 2 in a second time period T12, and is transmitted to the second network subscriber 12 in a third time period T13. The propagation time of the first message from the first network subscriber 10 to the second network subscriber 12 in the actual network from FIG. 1 is thus the sum of the three time periods T11, T12, T13.

The second propagation time N2 shows the propagation time for the first message from the first network subscriber 10 to the second network subscriber 12 by way of example for the target network shown in FIG. 2. The first message is first transmitted from the first network subscriber 10 to the first network element 22 in a fourth time period T1. The first network element 22 processes the first message in a fifth time period T2 and transmits the first message to the second network element 24 in a sixth time period T3. The second network element 24 processes the first message in a seventh time period T4 and transmits the first message to the second network subscriber 12 in an eighth time period T5. The propagation time of the first message from the first network subscriber 10 to the second network subscriber 12 in the target network from FIG. 2 is thus the sum of the five time periods T1, T2, T3, T4, T5. The delay of the first message by the gateway 2, and thus the length of the second time period, is then chosen such that the sum of the time periods of the first propagation time N1 is substantially equal to the sum of the time periods of the second propagation time N2.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A method in which propagation times of a target network are simulated in an actual network, the method comprising:
providing a topology of the target network with a plurality of senders and a plurality of receivers;
providing a topology of the actual network with one or more of the plurality of senders and the plurality of receivers, a path between a first sender and a first receiver in the topology of the actual network differs from a path between the first sender and the first receiver in the topology of the target network;
receiving, in the actual network, at least one first message of the first sender through a first network interface by a gateway having at least two network interfaces;
delaying the at least one first message by a delay, and sending the at least one first message then through a second network interface on a path to the first receiver;
determining the path of the at least one first message in accordance with the topology of the actual network; and
determining the delay of the at least one first message in accordance with the topology of the target network such that a propagation time of the first message in the actual network is substantially equal to a propagation time of the first message in the target network.

2. The method according to claim 1, wherein the path between the first sender and a second receiver in the topology of the target network differs from the path between the first sender and the first receiver in the topology of the target network, wherein, in the actual network, at least one second message of the first sender is received by the gateway and is delayed by a second delay and is sent on a path to the second receiver, wherein the path of the at least one second message is determined in accordance with the topology of the actual network, and wherein the delay of the at least one second message is determined in accordance with the topology of the target network such that the propagation time of the at least one second message in the actual network is substantially equal to the propagation time of the at least one second message in the target network.

3. The method according to claim 1,
wherein processing times of network elements in the target network are known to the gateway.

4. The method according to claim 1, wherein propagation times between network elements in the target network are known to the gateway.

5. The method according to claim 1, wherein the target network is at least partially an Ethernet, CAN, and/or FlexRay network.

6. The method according to claim 1, wherein a copy of the first message is sent by the gateway to a third receiver.

7. The method according to claim 6, wherein the at least one first message is tested by the gateway for at least one feature, and as a function of the test, a copy of the at least one first message is sent to the third receiver.

8. The method according to claim 1, wherein the at least one first message is altered by the gateway after being received and before being sent to the second receiver by the gateway.

9. The method according to claim 8, wherein altering of the at least one first message is a conversion of the at least one first message from a first protocol to a second protocol.

10. The method according to claim 8, wherein altering of the at least one first message is an alteration of the content of the at least one first message.

11. The method according to claim 1, wherein the gateway determines loading of network elements and/or network lines in the target network and additionally increases the delay of the at least one first message in an event of high loading of network elements and/or network lines.

12. The method according to claim 11, wherein a third message is received through a third network interface by the gateway, a path of the third message in the target network being determined by the gateway, and the delay of the at least one first message is increased if the third message in the target network results in an additional delay of the at least one first message.

13. The method according to claim 1, wherein a fourth message within the target network is simulated by the gateway, and the delay of the at least one first message is increased if the fourth message in the target network results in an additional delay of the at least one first message.

14. A gateway for simulating propagation times of a target network in an actual network, wherein a topology of the target network includes a plurality of senders and a plurality of receivers, wherein the topology of the actual network includes one or more of the plurality of senders and the plurality of receivers,
- wherein a path between a first sender and a first receiver in a topology of the actual network differs from a path between the first sender and the first receiver in the topology of the target network,
- wherein, in the actual network, at least one first message of the first sender is received through a first network interface by the gateway having at least two network interfaces, is delayed by a delay, and is sent through a second network interface on a path to the first receiver,
- wherein the path of the at least one first message is determined by the gateway in accordance with the topology of the actual network, and
- wherein the delay of the message is determined by the gateway in accordance with the topology of the target network such that a propagation time of the at least one first message in the actual network is substantially equal to a propagation time of the at least one first message in the target network.

15. A method of simulating propagation times of a target network in an actual network, the method comprising:
- providing a target network topology with a first sender and a second sender;
- providing an actual network with the first sender and the second sender;
- receiving a first message of the first sender in the actual network by a gateway through a first network interface;
- sending a delayed first message through a second network interface to the first receiver in the actual network;
- determining a path of the delayed first message in the actual network; and
- determining a delay of the first message in accordance with the topology of the target network,
- wherein a propagation time of the first message in the actual network is substantially equal to a propagation time of the first message in the target network.

\* \* \* \* \*